United States Patent Office 3,833,648
Patented Sept. 3, 1974

3,833,648
PROCESS FOR PREPARING ACYLPHENOXY-ALIPHATIC ACID DERIVATIVES
Hiroaki Moriyama and Hisao Yamamoto, Nishinomiya, Shigeho Inaba, Takarazuka, and Hideo Nagata and Toshio Tamaki, Ibaraki, Japan, assignors to Sumitomo Chemical Co., Ltd., Osaka, Japan
No Drawing. Filed Oct. 28, 1970, Ser. No. 84,875
Claims priority, application Japan, Oct. 30, 1969, 44/87,459
Int. Cl. C07c 65/14
U.S. Cl. 260—520      3 Claims

ABSTRACT OF THE DISCLOSURE

A process for producing acylphenoxy aliphatic carboxylic acid derivatives represented by the general formula,

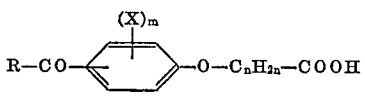

wherein R is a lower alkyl, alkenyl or alkynyl group, X is the same or different hydrogen atom, halogen atom, lower alkyl group, trifluoromethyl group or lower alkoxy group, and when substituted on adjacent carbon atoms of the benzene ring, two X's radicals may be joined together to form a hydrocarbylene chain containing four carbon atoms between its points of attachment, for example, tetramethylene, 1,3-butadienylene, etc., $m$ is an integer of 1 to 4 and $n$ is an integer of 1 to 4, characterized by reacting an ω-nitroacylphenoxyalkyl hydrocarbon derivative represented by the general formula,

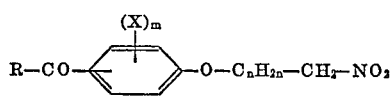

wherein R, X, $m$ and $n$ are as defined above, with a strong acid.

---

This invention relates to a novel process for producing acylphenoxy aliphatic acid derivatives.

More particularly the present invention relates to a process for producing acylphenoxy aliphatic acid derivatives represented by the general formula (I),

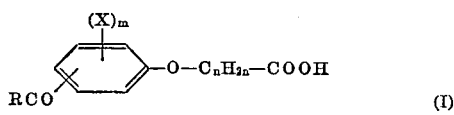

wherein R is a lower alkyl, alkenyl or alkynyl group, X is the same or different hydrogen atom, halogen atom, lower alkyl group, trifluoromethyl group or lower alkoxy group, and when substituted on adjacent carbon atoms of the benzene ring, two X's radicals may be joined together to form a hydrocarbylene chain containing four carbon atoms between its points of attachment, for example, tetramethylene, 1,3-butadienylene, etc., $m$ is an integer of 1 to 4 and $n$ is an integer of 1 to 4.

The acylphenoxy aliphatic acid derivatives represented by the above general formula (I) are known compounds which are useful as medicines and agricultural chemicals and their intermediates. For example, these compounds are effective diuretic and saluretic agents which can be used in the treatment of conditions associated with electrolyte and fluid tension and hypertension.

According to the process of prior art, these acylphenoxyaliphatic acid derivatives have been produced by various methods, typical example of which is shown by the following reaction schema with reference to 2,3-dichloro-4-(2-methylenebutyryl)phenoxyacetic acid which is one of the most excellent urinating agent:

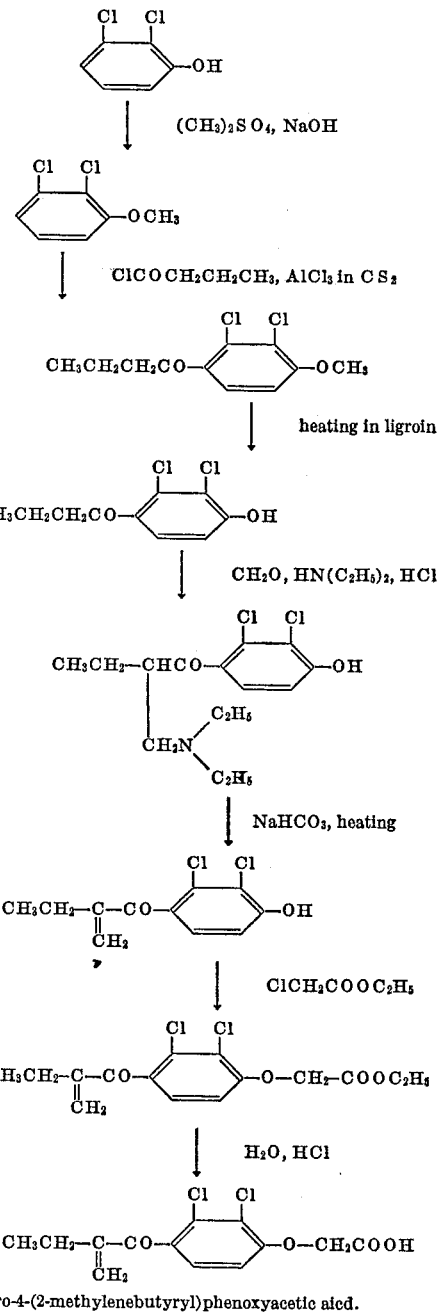

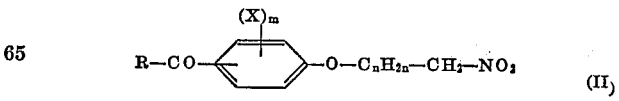
2,3-dichloro-4-(2-methylenebutyryl)phenoxyacetic aicd.

We have found that the acylphenoxy aliphatic acid derivatives of the general formula (I) are very easily obtained by reacting an ω-nitroacylphenoxyaliphatic hydrocarbon derivative represented by the general formula (II)

$$R-CO-\underset{(X)_m}{\underset{|}{\bigcirc}}-O-C_nH_{2n}-CH_2-NO_2 \qquad (II)$$

wherein R, X, $m$ and $n$ are as defined before, with an inorganic acid.

An object of the present invention is to provide an industrially useful novel process for producing such therapeutically valuable compounds.

In order to accomplish this object, the present invention provides a process for producing acylphenoxyaliphatic acid derivatives of the formula (I), which comprises reacting an ω-nitroacylphenoxyaliphatic hydrocarbon derivative of the formula (II) with a strong acid.

In the present invention, examples of the lower alkyl group include methyl, ethyl, propyl, isopropyl, butyl, isobutyl and tertiary butyl group; examples of the alkenyl group include vinyl, propenyl, isopropenyl, butenyl, 1-ethyl-oinyl, i-isobutylvinyl, 1-propylvinyl, 1-isopropylvinyl, 1-butylvinyl, 1-pentylvinyl, allyl and 1-ethyl-1-propenyl; examples of the alkynyl group include propynyl, butynyl, pentynyl, hexynyl, and heptynyl group; examples of the halogen atom include chlorine, bromine, iodine and fluorine; and examples of the aliphatic hydrocarbon chain of the —$C_nH_{2n}$— in the above-mentioned formula include methylene, ethylene, trimethylene, propylene, methylmethylene, ethylethylene.

The ω-nitroacylphenoxyaliphatic hydrocarbon derivatives of the above general formula (II) to be used as starting materials in the process of the present invention are novel compounds. These compounds may be easily obtained, for example, by the reactions as shown by the following reaction schema:

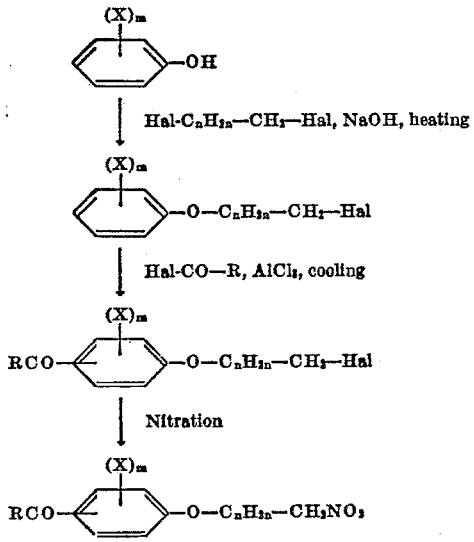

wherein R, X, m and n are as defined before; and Hal is a halogen atom.

In the process of the present invention, the amount of the strong acid is not critical, however it is preferable to use 1 mole of the strong acid per 1 mole of the ω-nitroacylphenoxyaliphatic hydrocarbon derivatives. Examples of the strong acid used in the process of the present invention include hydrochloric acid, sulfuric acid, benzenesulfonic acid, p-toluenesulfonic acid and methane sulfonic acid. The reaction of the process of the present invention may be carried out in water or in mixtures of water and organic solvent such as acetone, methylisobutylketone, dimethylformamide, dioxane, ethanol, butanol, benzene and toluene.

The reaction requires a temperature of 0–200° C., preferably 50–150° C., more preferably as the boiling point of the water or mixture of water and organic solvent.

According to the process of the present invention, the yield is high and the acylphenoxy aliphatic acid derivatives is obtained in such a high purity that it is usually unnecessary to purify the obtained product by such a method as recrystallization. Further, as mentioned above, the ω-nitroacylphenoxyaliphatic hydrocarbon derivatives of the formula (II) employed in the process of the present invention are very easily obtainable from industrially available starting materials. Therefore it is to be said that the process of the present invention is very advantageous.

The invention will be explained by means of the following Examples which are given for the illustration purpose only and not for limiting the scope of the invention in any way.

EXAMPLE 1

A mixture of 3.0 g. of 2,3-dichloro-4-butyrylphenoxy-nitroethane and 75 cc. of 18% hydrochloric acid is heated under reflux at 107° C. for 16 hours with stirring. After cooling, the reaction mixture is extracted with ether. The ethereal layer is washed with water and then extracted with 10 cc. of 10% aqueous ammonia. The aqueous layer is separated and the ether dissolved in the aqueous layer is removed under reduced pressure. The aqueous layer is made slightly acidic with 10% hydrochloric acid. After cooling, the precipitates are collected by filtration, washed with ice water and dried in a vacuum dryer to give 2.5 g. of 2,3-dichloro-4-butyrylphenoxyacetic acid, melting at 99.1 to 100.8° C. Yield 86%.

*Elementary analysis.*—Calculated: C, 49.51%; H, 4.15%; Cl, 24.36%. Found: C, 50.30%; H, 4.75%; Cl, 24.57%.

EXAMPLE 2

Six point four grams of 2,3-dichloro-4-(2-methylenebutyryl)phenoxy-ω-nitroethane) are reacted with 100 cc. of 18% hydrochloric acid for 14 hours in the same manner as in Example 1. The reaction mixture is cooled and extracted with ether. The ethereal layer is washed with water and then extracted with 15 cc. of 10% aqueous ammonia. The aqueous layer is separated and the ether dissolved in the aqueous layer is removed under reduced pressure. The aqueous layer is cooled, made slightly acidic with 10% hydrochloric acid. After cooling, the precipitates are collected by filtration, washed with water and dried in a vacuum dryer to give 5.3 g. of 2,3-dichloro-4-(2-methylenebutyryl)phenoxy-acetic acid, melting at 116.7 to 118.3° C. Yield 80.5%.

*Elementary analysis.*—Calculated: C, 51.51%; H, 3.99%; Cl, 23.39%. Found: C, 52.01%; H, 4.02%; Cl, 23.76%.

EXAMPLE 3

Eight point nine grams of 2-[3-chloro-4-(2-methylenebutyryl)phenoxy]-1-nitropropane is reacted with 145 cc. of 18% hydrochloric acid for 17 hours in the same manner as in Example 1. After the completion of the reaction, the reaction mixture is cooled, extracted with ether. The ether extract is washed with water and extracted with 18 cc. of 10% aqueous ammonia. The aqueous layer is separated, and the ether dissolved in the aqueous layer is removed under reduced pressure. Then the extract is made acidic with 10% hydrochloric acid and is cooled. The deposited 2-[3-chloro-4-(2-methylenebutyryl)phenoxy]propionic acid is collected by filtration, washed with water and dried in a vacuum dryer. The yield is 6.0 g. (77.5% of theoretical yield).

*Elementary analysis.*—Calculated: C, 59.47%; H, 5.35%; Cl, 12.54%. Found: C, 58.68%; H, 5.62%; Cl, 12.81%.

EXAMPLE 4

Two point eight grams of 3-[3-chloro-4-(2-methylenepropionyl)phenoxy]-1-nitropropane is reacted with 60 cc. of 18% hydrochloric acid for 20 hours in the same manner as in Example 1. After the completion of the reaction, the reaction mixture is cooled and extracted with ether. The ether layer is separated and washed with water and extracted with 14 cc. of 10% aqueous ammonia. The aqueous layer is separated, and the ether dissolved in the aqueous layer is removed under reduced pressure. The extract is made slightly acidic with 10% hydrochloric acid and cooled. The deposited fine crystals are collected by filtration, and washed with water and dried in a vacuum dryer to give 2.4 g. of 3-[3-chloro-4-(2-methylenepropionyl)phenoxy]acetic acid melting at 71.0 to 72.1° C. Yield 87.1%.

*Elementary analysis.*—Calculated: C, 58.11%; H, 4.88%; Cl, 13.20%. Found: C, 58.65%; H, 4.99%; Cl, 13.26%.

What we claim is:

1. A process for producing an acylphenoxy aliphatic carboxylic acid represented by the general formula,

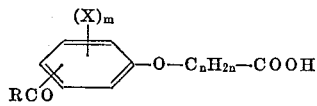

wherein R is a lower alkyl, alkenyl or alkynyl group, X is the same or different hydrogen atom, halogen atom, lower alkyl group, trifluoromethyl group or lower alkoxy group, and when substituted on adjacent carbon atoms of the benzene ring, two X's radicals may be joined together to form a hydrocarbylene chain containing four carbon atoms between its point of attachment, $m$ is an integer of 1 to 4 and $n$ is an integer of 1 to 4, characterized by reacting an ω-nitroacylphenoxyalkyl hydrocarbon derivative represented by the general formula,

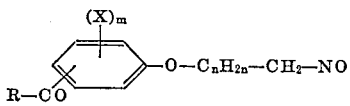

wherein R, X, $m$ and $n$ are as defined above, with an 18% aqueous hydrochloric acid solution at a temperature of from 50° C. to 150° C.

2. The process according to claim 1 wherein the acylphenoxyalkyl carboxylic acid derivative is a member selected from the group consisting of 2,3-dichloro-4-butyrylphenoxyacetic acid, 2,3-dichloro-4-(2-methylenebutyryl) phenoxyacetic acid, 2-[3-chloro-4-(2-methylenebutyryl) phenoxy] propionic acid and 3-[3-chloro-4-(2-methylenepropionyl)phenoxy] acetic acid.

3. A process according to claim 1, wherein the hydrocarbylene chain is selected from the group consisting of tetramethylene and 1,3-butadienylene.

References Cited

Kornblum et al.: *J. Am. Chem. Soc., 87,* 1742 (1965).
March: Adv. Org. Chem. Reactions, Mechanisms, and Structure, McGraw-Hill (1968), p. 660.
Burwell: Chem. Rev., 54 (1954), pp. 622–635.

JAMES A. PATTEN, Primary Examiner

J. F. TERAPANE, Assistant Examiner

U.S. Cl. X.R.

260—521 R, 521 A, 590, 592, 612 D